UNITED STATES PATENT OFFICE.

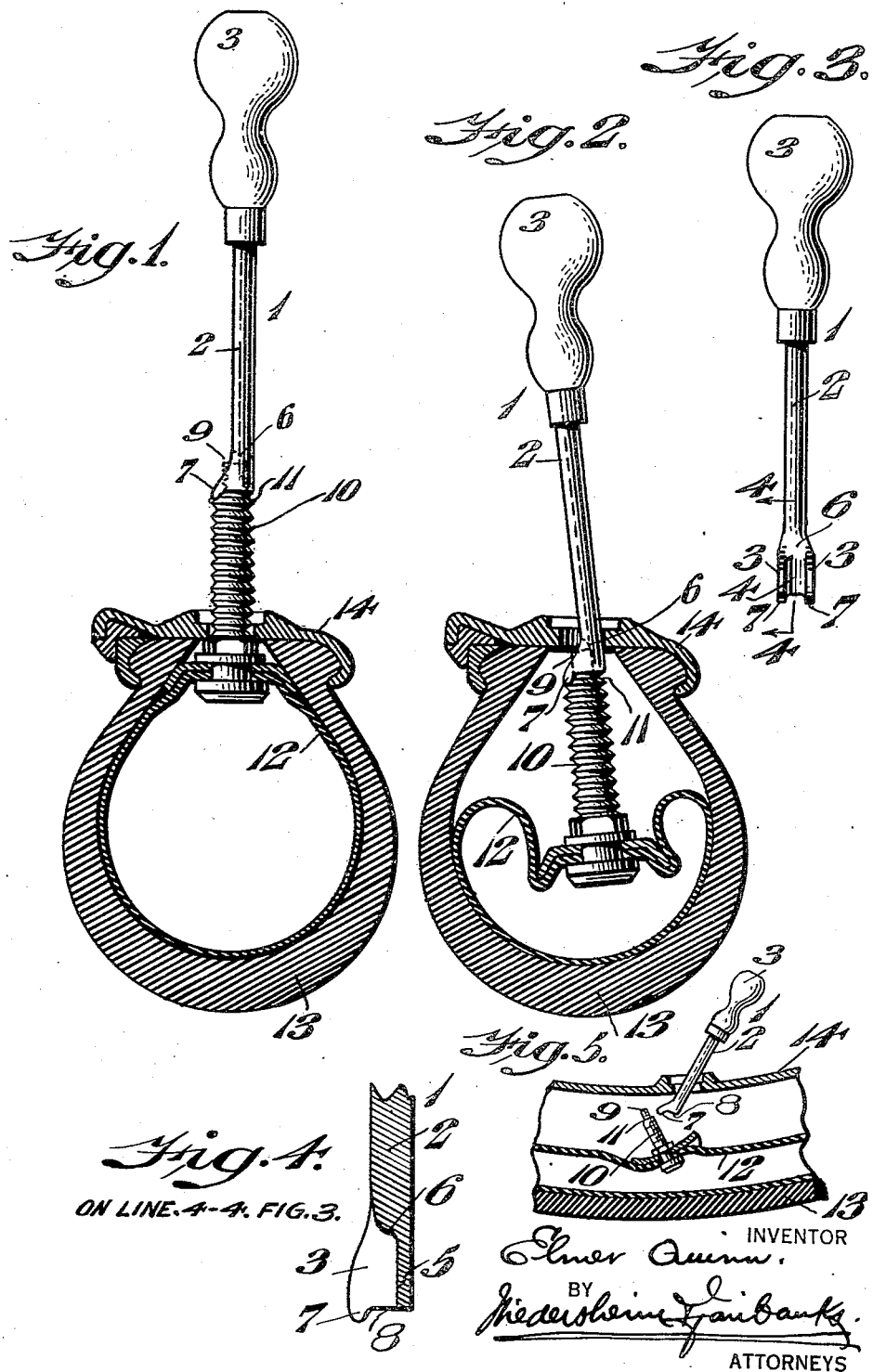

ELMER QUINN, OF PHILADELPHIA, PENNSYLVANIA.

TOOL FOR RELEASING AN AIR VALVE FROM RIM OF AN AUTOMOBILE TIRE.

1,421,987.     Specification of Letters Patent.     Patented July 4, 1922.

Application filed April 5, 1921. Serial No. 458,664.

*To all whom it may concern:*

Be it known that I, ELMER QUINN, a citizen of the United States, residing in the city and county of Philadelphia, State of Pennsylvania, have invented a new and useful Tool for Releasing an Air Valve from Rim of an Automobile Tire, of which the following is a specification.

It is well known that the threaded nipple or casing which contains the air valve of the inner tube of a pneumatic tire or shoe frequently sticks or becomes rusted in place, when it is desired to push the same inwardly to remove the inner tube from said tire or shoe and the present practice is generally to take a screw driver or similar implement and push or press on the air valve of the inner tube in the endeavor to push it inwardly with respect to the rim and outer shoe. Frequently this implement slips and results in the puncturing of the inner tube and the object of my present invention is to provide a novel tool or implement having its end provided with a cavity, an upper abutment and walls of a novel construction and configuration, whereby when the operative end of my novel tool is placed upon the upper shoulder of the air valve nipple or threaded casing and pressure is exerted thereon there is no liability of said tool slipping off the air valve or nipple and puncturing said inner tube, or injuring said air valve.

To the above ends my invention consists of a novel construction of an implement or tool for releasing the air valve from the rim of an automobile tire or shoe, said tool having a stem provided at its lower portion with a cavity or seat of novel configuration and having walls and depending heels or outer terminals, which effectively engage the upper portion or shoulder of the air valve or nipple, in such a way that the same can be effectively and instantaneously pushed inwardly or disengaged from the rim and there is in addition no liability of the tool slipping and puncturing the inner tube or damaging said valve.

It further consists of other novel features of construction and advantage, as will be hereinafter fully set forth and pointed out in the claims.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of my novel tool for releasing an air valve from the rim of an automobile tire, showing the initial step in the application of the same to an air valve or the shoulder of its nipple.

Figure 2 represents a view similar to Figure 1 but showing the inner tube deflated and showing the manner of using my novel tool.

Figure 3 represents a side elevation of the tool seen in Figures 1 and 2 and viewed in an opposite direction.

Figure 4 represents a section on line 4—4 of Figure 3. Figure 5 represents a sectional view of a tire rim and inner tube, showing my invention applied thereto.

Similar numerals of reference indicate corresponding parts.

Referring to the drawings:—

1 designates my novel construction of a tool for releasing the air valve from the rim of an automobile tire or shoe, said tool comprising the stem or spindle 2, having the handle 3 at one end, and at its other end the novel conformation for the purposes hereafter described, comprising the parallel walls 3, forming the chamber or seat 4, which is open at one side and closed at its opposite side by the wall 5. The upper portion of said seat 4 is provided with the rounded wall or abutment 6, and the lower outer ends of the parallel walls 3 terminate in the pendant heels or lips 7, from which extend the bottom substantially horizontal edges 8, of the parallel vertical walls 3 as will be best understood from Figure 4, wherein it will also be seen that the walls 3 are slightly projected outwardly, so as to form an extended bearing surface to contact with or engage the reduced end 9 of the nipple or threaded air valve casing 10 which has the upper shoulder 11 and is secured to the inner tube 12 in any conventional manner, said tube being contained in the tire or shoe 13, which is provided with the demountable rim 14 and its adjuncts of any conventional type.

The manner of applying or using my novel tool will be understood from Figures 1, 2 and 5, wherein Figure 1 illustrates the normal position of the rim, shoe, inner tube, air valve and their adjuncts. When it is desired to release the air valve from the rim, it is only necessary to apply the bottom edges 8 of my novel tool 1, to the top or shoulder 11 of the air valve as seen in Figure 1 and then to push inwardly thereupon, whereupon the parts will assume the position seen in Figure 2. During the engagement of the operative end of the tool with the reduced end 9 of the nipple, it will be apparent that the walls 3 effectively engage said end and the pendant heels or lips 7 engage and slightly overhang the shoulder 11 while the upper wall shoulder 6 is located at such a point that there is sufficient clearance provided, so that the valve stem will not be injured. The rear wall 5 is so positioned that the vertical axial line of the chamber 4, substantially aligns with the longitudinal axis of the stem 2, and with the axial line of the nipple or valve casing 10, so that the thrust on the handle 3 is exerted on the shoulder 11 in a line substantially coincident with the axle of said nipple and there is consequently no liability of the tool slipping and puncturing the inner tube.

There is also in my device no liability of damaging the air valve or its stem, which frequently happens when a screw driver is applied thereto, and after the nipple is pushed through the rim, the position of the parts will appear as seen in Figure 5, so that there is no liability of damage to the inner tube when my device is employed.

It will now be apparent that I have devised a novel and useful tool for releasing an air valve from rim of an automobile tire, which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the character described, a tool having at its lower portion a chamber provided with an upper wall 6, a rear wall 5, and side walls 3, the latter having the terminal horizontal edges 8, and the outer depending terminal lips 7, whereby a chamber is formed between the walls 3 and 5 adapted for the reception of the upper end of the nipple, said terminal lips being adapted to overhang the upper shoulder of said nipple.

2. In a device of the character described, a tool having a stem provided at its lower portion, with a chamber open at one side and formed by the side walls 3, and the wall 5, the lower edges 8 of said walls 3 being horizontal and terminating in the outer pendant terminal lips 7, and the vertical axial line of said stem and chamber being coincident, said chamber being adapted to receive the upper end of a nipple and said lips being adapted to overhang the upper shoulder thereof, whereby injury to the tube carrying the nipple is prevented.

ELMER QUINN.

Witnesses:
E. HAYWARD FAIRBANKS,
C. D. McVAY.